United States Patent
Schreck et al.

(10) Patent No.: US 7,199,960 B1
(45) Date of Patent: Apr. 3, 2007

(54) DISK DRIVE WITH AC EXCITER FOR HEAD/DISK INTERFACE

(75) Inventors: Erhard T. Schreck, San Jose, CA (US); Robert E. Eaton, San Jose, CA (US)

(73) Assignee: Maxtor Corporation, Scotts Valley, CA (US)

( * ) Notice: Subject to any disclaimer, the term of this patent is extended or adjusted under 35 U.S.C. 154(b) by 129 days.

(21) Appl. No.: 10/317,016

(22) Filed: Dec. 11, 2002

Related U.S. Application Data

(60) Provisional application No. 60/339,458, filed on Dec. 11, 2001.

(51) Int. Cl.
*G11B 21/02* (2006.01)

(52) U.S. Cl. ............... 360/75; 360/31; 360/25; 360/78.14; 360/78.04; 360/77.03

(58) Field of Classification Search ............ None
See application file for complete search history.

(56) References Cited

U.S. PATENT DOCUMENTS

| | | | | |
|---|---|---|---|---|
| 4,853,810 A | * | 8/1989 | Pohl et al. ............... 360/234.7 |
| 4,931,887 A | * | 6/1990 | Hegde et al. ............ 360/75 |
| 5,130,866 A | * | 7/1992 | Klaassen et al. ......... 360/75 |
| 5,153,785 A | * | 10/1992 | Muranushi et al. ....... 360/75 |
| 5,488,519 A | * | 1/1996 | Ishida et al. ............ 360/77.03 |
| 5,546,374 A | * | 8/1996 | Kuroda et al. ........... 369/126 |
| 5,710,632 A | * | 1/1998 | Li ........................... 356/507 |
| 5,991,113 A | * | 11/1999 | Meyer et al. ............. 360/75 |
| 6,005,736 A | * | 12/1999 | Schreck ................... 360/75 |
| 6,275,029 B1 | * | 8/2001 | Schaff ..................... 324/212 |
| 6,344,949 B1 | * | 2/2002 | Albrecht et al. ......... 360/236.5 |
| 6,359,746 B1 | * | 3/2002 | Kakekado et al. ....... 360/75 |
| 6,452,735 B1 | | 9/2002 | Egan et al. .............. 360/34 |
| 6,529,342 B1 | * | 3/2003 | Feng et al. .............. 360/75 |
| 6,577,466 B2 | * | 6/2003 | Meyer et al. ............ 360/75 |
| 6,700,724 B2 | * | 3/2004 | Riddering et al. ....... 360/69 |
| 6,710,952 B1 | * | 3/2004 | Smith ....................... 360/31 |
| 6,735,036 B1 | * | 5/2004 | Olim ........................ 360/75 |
| 6,757,120 B2 | * | 6/2004 | Minoshima et al. ..... 360/31 |
| 6,876,509 B2 | * | 4/2005 | Bonin et al. ............. 360/75 |
| 6,888,693 B2 | * | 5/2005 | Boutaghou et al. ..... 360/75 |
| 6,950,266 B1 | * | 9/2005 | McCaslin et al. ....... 360/75 |
| 6,967,805 B1 | * | 11/2005 | Hanchi et al. ........... 360/75 |
| 6,967,806 B2 | * | 11/2005 | Rao et al. ................ 360/75 |
| 6,972,919 B2 | * | 12/2005 | Suk .......................... 360/75 |
| 7,016,139 B2 | * | 3/2006 | Baumgart et al. ....... 360/75 |
| 7,042,670 B2 | * | 5/2006 | Feng et al. .............. 360/75 |
| 7,068,457 B2 | * | 6/2006 | Riddering et al. ....... 360/75 |
| 7,088,532 B1 | * | 8/2006 | Krajnovich et al. ..... 360/25 |

* cited by examiner

*Primary Examiner*—Andrea Wellington
*Assistant Examiner*—Dismery Mercedes

(57) ABSTRACT

A disk drive includes a disk for storing information, a head with a transducer that writes data to and reads data from the disk, and an AC power source. The head is suspended adjacent to the disk and a flying height gap exists at the head/disk interface. The AC power source generates an AC exciter signal across the flying height gap that discharges electrostatic charge at the head/disk interface. The head/disk capacitance can be measured based on the AC exciter signal to sense the flying height. The AC exciter signal can also alter an attraction force between the head and the disk and thus control flying height. The AC exciter signal can also be based on a flying height signal representative of the head/disk capacitance and thus the flying height.

131 Claims, 4 Drawing Sheets

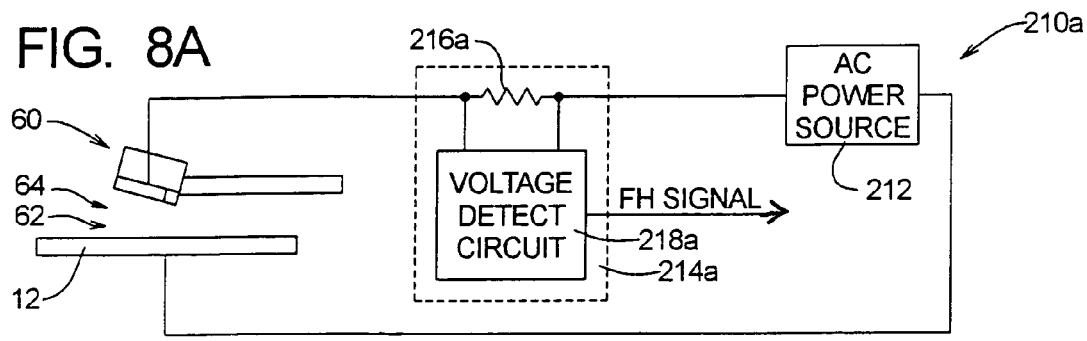
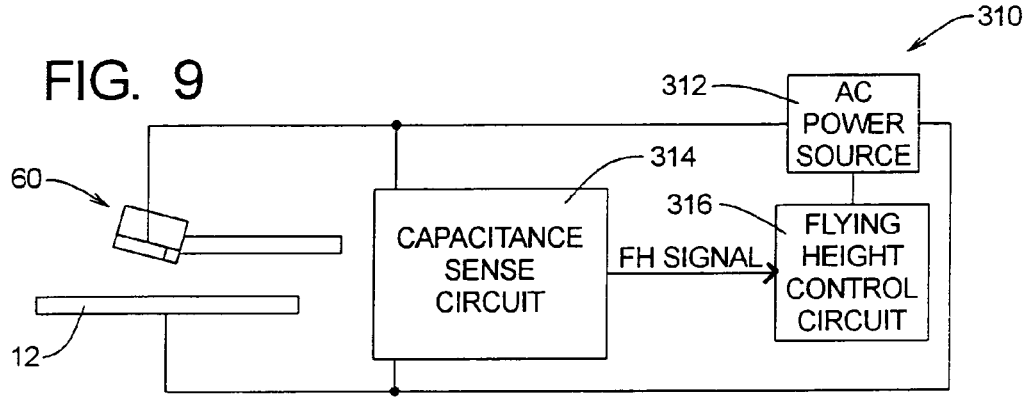
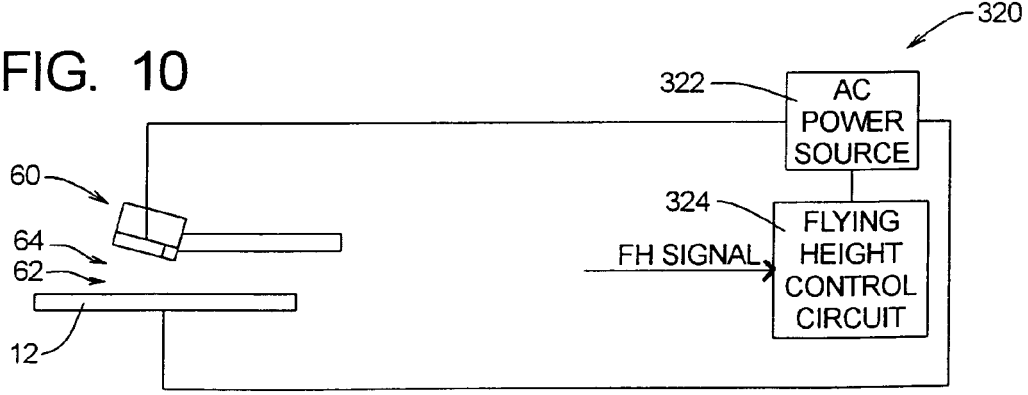
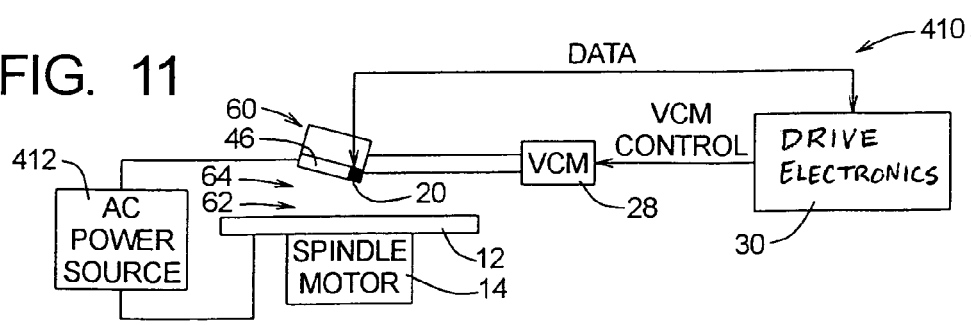

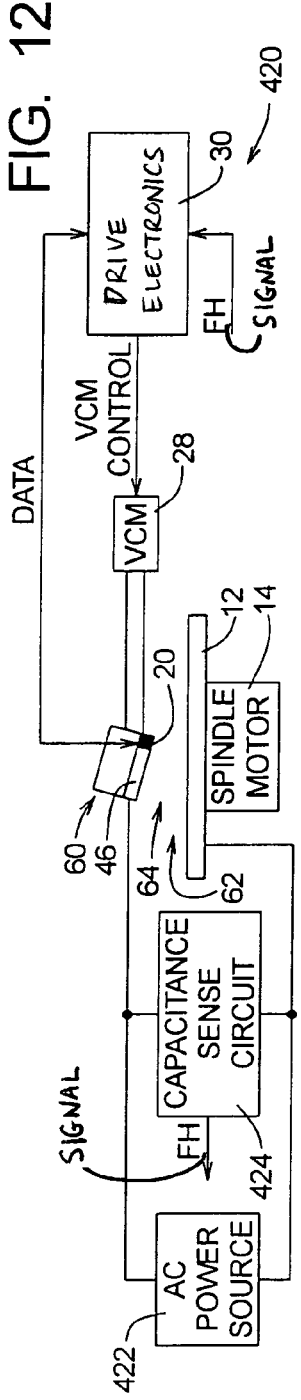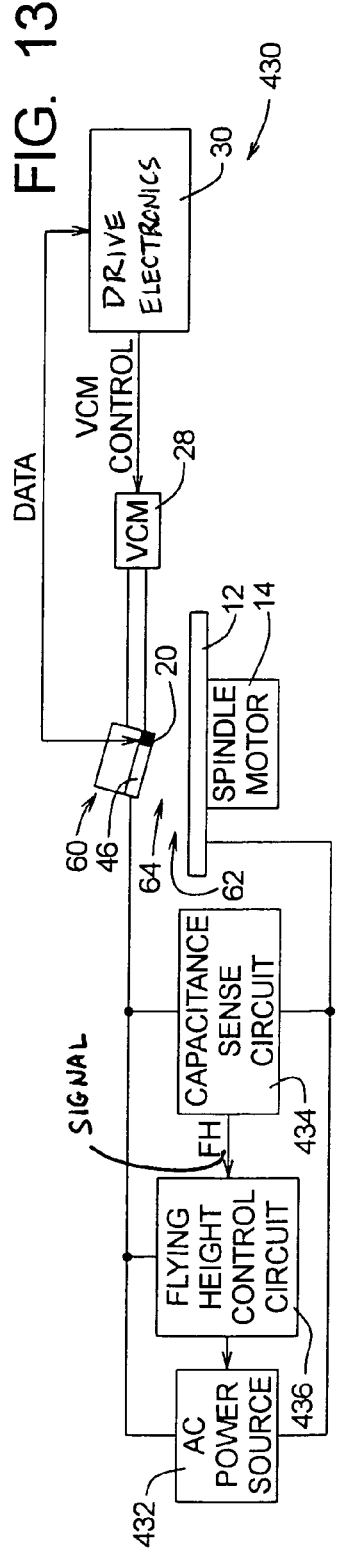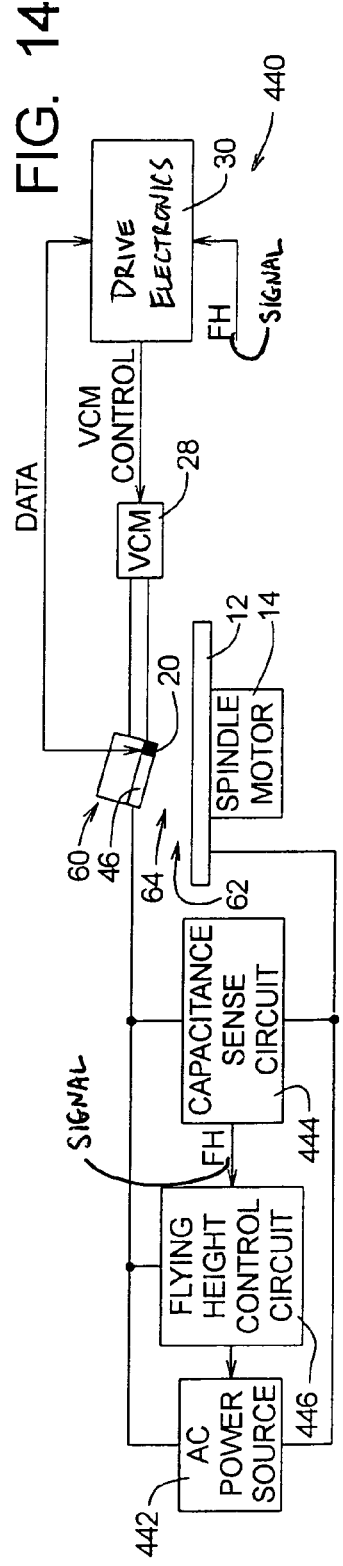

DISK DRIVE WITH AC EXCITER FOR HEAD/DISK INTERFACE

RELATED APPLICATIONS

Priority is claimed from U.S. Provisional Patent Application Ser. No. 60/339,458 filed on Dec. 11, 2001, which is incorporated by reference in its entirety.

FIELD OF THE INVENTION

The present invention relates to digital storage devices and, more particularly, to hard disk drives.

BACKGROUND OF THE INVENTION

A disk drive is a digital data storage device that stores information within concentric tracks on a storage disk. The disk is coated on both of its primary surfaces with a magnetic material that is capable of changing its magnetic orientation in response to an applied magnetic field. During operation of the disk drive, the disk is rotated about a central axis at a constant rate. To read data from or write data to the disk, a magnetic transducer (or head) is positioned above (or below) a desired track of the disk while the disk is spinning.

Writing is performed by delivering a polarity-switching write current signal to the transducer while the transducer is positioned above (or below) the desired track. The write signal creates a variable magnetic field at a gap portion of the transducer that induces magnetically polarized transitions into the desired track. The magnetically polarized transitions are representative of the data being stored.

Reading is performed by sensing the magnetically polarized transitions on a track with the transducer. As the disk spins below (or above) the transducer, the magnetically polarized transitions on the track induce a varying magnetic field into the transducer. The transducer converts the varying magnetic field into a read signal that is delivered to a preamplifier and then to a read channel for appropriate processing. The read channel converts the read signal into a digital signal that is processed and then provided by a controller to a host computer.

The write and read signals are analog signals that define what is referred to as a data band. The data band is a range of frequencies in which the write and read signals are contained.

FIG. 1 illustrates a conventional disk drive 10. The disk drive 10 includes a disk 12 that is rotated by a spindle motor 14. The spindle motor 14 is mounted to a base plate 16. An actuator arm assembly 18 is also mounted to the base plate 16.

The actuator arm assembly 18 includes a transducer 20 mounted to a flexure arm 22, which is attached to an actuator arm 24 that can rotate about a bearing assembly 26. A voice coil motor (VCM) 28 is coupled with the actuator arm assembly 18 to radially position the transducer 20 relative to the disk 12. The spindle motor 14, the transducer 20 and the VCM 28 are coupled to drive electronics 30 mounted to a printed circuit board (not shown). The drive electronics 30 typically include a preamplifier, a read channel, a servo control unit, a microprocessor-based controller, and a random access memory (RAM).

The disk drive 10 includes at least one and typically multiple disks 12, each with one or two recording surfaces. An actuator arm assembly 18 is provided for each recording surface of each disk 12.

The transducer 20 is a dual element transducer that includes separate read and write elements. Single element transducers usually contain a single inductive element that performs both read and write functions, whereas dual element transducers usually contain a magneto-resistive (MR) read element and an inductive write element. The MR read element can be a conventional magneto-resistive element, a giant magneto-resistive (GMR) element, or a similar component.

Since the transducer 20 is a dual element transducer, the read and write elements can be optimized for their respective functions. For example, MR read elements are more sensitive than inductive read elements to small variable magnetic fields, which permits MR read elements to read much fainter signals from the disk 12. Employing an MR read element permits data to be more densely packed on the disk 12.

MR read elements generally include a strip of magneto-resistive material between two magnetic shields. When properly biased, the resistance of the magneto-resistive material varies almost linearly with an applied magnetic field. During a read operation, the MR strip is positioned above (or below) a desired track within the varying magnetic field caused by magnetic transitions on the track and a constant bias current is passed through the strip. By Ohm's law (V=IR), the variable resistance and the constant bias current of the MR strip result in a variable voltage across the MR strip that is proportional to the variable resistance. That is, $V+\delta V=I(R+\delta R)$. Therefore, the variable voltage is representative of the data stored within the desired track. The variable voltage provides an analog read signal which is then amplified by the preamplifier, processed and converted into digital form by the read channel, and transferred by the controller to a host computer.

FIG. 2 is a diagrammatic representation of an air bearing surface of the transducer 20 which faces the disk 12. As is seen, the transducer 20 includes an inductive write element 34, a write gap 36, a first shield 38, a second shield 40, a read gap 42, and an MR read element 44.

During a read operation, the magnetically polarized transitions previously written onto the disk 12 are read by the MR read element 44. The first and second shields 38 and 40 form the read gap 42 which serves to focus the flux from the magnetically polarized transitions onto the MR read element 44 by shielding the MR element 44 from other sources of magnetic flux (e.g., sources of magnetic flux not associated with the particular location from which information is being read). In other words, the first and second shields 38 and 40 shunt extraneous magnetic flux away from the MR read element 44 as reading occurs.

During a write operation, variable current is applied to write coils (not shown) in the transducer 20 which induce magnetic flux across the write gap 36 between the write element 34 and the first shield 38. The write element 34 and first shield 38 act as poles for an electromagnet which induces the magnetic flux across the write gap 36 that records magnetically polarized transitions on the disk 12. Furthermore, since the magnetic flux in the write gap 36 has relatively high intensity, and the MR read element 44 is in close proximity to the write gap 36, a large amount of the magnetic flux across the write gap 36 affects the MR read element 44 during a write operation. Consequently, the MR read element 44 is typically not used to read data from the disk 12 during a write operation.

FIG. 3 is a simplified diagrammatic representation of a cross-sectional view of an air bearing slider 46 that includes the transducer 20 flying above a disk surface 48 of the disk 12. The slider 46 is located at the distal end (opposite VCM 28) of the actuator arm assembly 18. The slider 46 includes a leading edge 50 and a trailing edge 52. The transducer 20 is located proximate to the trailing edge 52. The distance between the transducer 20 and the disk surface 48 is known as the flying height ($h_f$) of the transducer 20.

The transducer 20 and the slider 46 form a head 60. A head/disk interface 62 is defined by the head 60 and the disk 12. More specifically, the head/disk interface 62 comprises the disk 12, the slider 46, and, during normal read and write operations, a flying height gap 64 between the head 60 and the disk surface 48 of the disk 12. The flying height gap 64 is a three-dimensional space defined by the shortest distance between each point on the head 60 exposed to the disk surface 48 and a corresponding point on the disk surface 48 along a line perpendicular to the disk surface 48. The volume of the flying height gap 64 typically varies as the distance between the head 60 and the disk surface 48 changes during disk drive operations.

During operation of the disk drive 10, a preload force is applied to the head 60. The preload force is the composite forces applied by a number of sources. In particular, the flexure arm 22 applies a mechanical spring force to bias the head 60 towards the disk 12. At the same time, the disk 12 is rotated in the direction of arrow A from the leading edge 50 to the trailing edge 52. The slider 46 is aerodynamically designed so that, when the disk 12 rotates at its normal operating speed, a small cushion of air between the slider 46 and the disk surface 48 forces the slider 46 (and hence the head 60) away from the disk surface 48 against the spring force applied by the flexure arm 22. The passive mechanical and aerodynamic forces that hold the head 60 away from the disk 12 are referred to as an air bearing system. Ideally, the air bearing system is designed to maintain the head 60 at a nominal flying height. However, several factors can affect the actual flying height of the head 60 of a given disk drive 10.

Initially, the flying heights of two disk drives 10 that are theoretically identical are often different upon manufacture and/or during use. The tolerances of the mechanical parts used during the assembly of different disk drives 10 can differ. Different tolerances can lead to different preload forces for different individual disk drives 10. In addition, different operating environments can result in different flying heights. For example, the flying height will typically be lower at high altitude than at sea level.

The slider 46 is shaped so that fly height is less susceptible to variations in preload forces and operating environments. However, shaping the slider 46 based on fly height considerations can result in a slider 46 that is not optimized for other considerations such as reducing debris collection. In addition, different sliders 46 may be required for operating parameters, such as disk revolution speed, associated with different disk drive products. The use of different sliders for different products typically results in increased manufacturing costs.

In addition, even for a particular disk drive 10 under normal operating environments, the flying height can change during disk drive operation for various reasons. First, the slider 46 may strike contaminants 54 on the disk surface 48 which temporarily stick to the slider 46 and change its aerodynamic characteristics. Second, the slider 46 may strike and bounce off contaminants 54 or perturbations 56 in the disk surface 48. In addition, gradual accumulation of debris onto the slider 46 can increase the flying height.

FIG. 4 is a simplified diagrammatic representation of a cross-sectional view of the slider 46 during high fly writing. As shown in FIG. 4, the flying height ($h_f$) of the transducer 20 exceeds a predetermined nominal flying height ($h_{nom}$) by a distance x. In other words, $h_f = h_{nom} + x$. The flying height ($h_f$) of the transducer 20 is related to the flying height gap 64.

The performance of the disk drive 10 will depend, to a large extent, on whether the flying height of the head 60, and thus the transducer 20, stays within a predetermined flying height range. For instance, if the flying height of the transducer 20 is too low then the head 60 might engage in excessive contact with the disk surface 48. This contact may damage the transducer 20 and/or the disk 12 or cause excessive debris or lubricant from the disk surface 48 to accumulate on the head 60.

On the other hand, if the flying height of head 60 is too high, then data errors might occur during read and write operations. More particularly, if the transducer 20 flies too high during a read operation then the transducer 20 might not adequately sense the magnetic polarity transitions on the disk 12, and if the transducer 20 flies too high during a write operation then the transducer 20 might not adequately induce the magnetic polarity transitions onto the disk 12.

When the write element 34 is higher than the predetermined maximum flying height, the magnetically polarized transitions (data) written onto the disk 12 are faintly or poorly written. Consequently, the poorly written data is not properly read by the MR read element 44 when such data is sought to be recovered. In addition, since the write element 34 is higher than the predetermined maximum flying height, the write element 34 may also write over parts of tracks adjacent to the track onto which the data is sought to be written. This may render previously written data on the adjacent tracks to be unreadable.

Unexpected changes in flying height can thus result in performance and/or reliability degradation of the disk drive 10. One purpose of the present invention is to alleviate the problem of high fly writing which occurs when the disk drive 10 performs a write operation while the transducer 20 flies too high.

Another potential problem with conventional head/disk interfaces is the electrostatic charging of the head/disk interface. Several known phenomena are capable of causing an electrostatic charge to build up on the disk 12 and/or head 60 during disk drive operations. For example, if the head 60 comes into contact with the disk 12, an electrostatic charge can be induced in the disk 12 and/or the head 60. Repeated contact between the head 60 and the disk 12 can cause the electrostatic charge to accumulate over time. Electrostatic charge on the head 60 and the disk 12 can cause a difference in electrical potential between the head 60 and the disk 12. Such potential differences, especially as the electrostatic charge accumulates, can result in current flow between the head 60 and the disk 12 if the head 60 contacts the disk 12. Current flow between the head 60 and the disk 12 can result in a change in the electrochemical characteristics of one or both of the head 60 and the disk 12 at the head/disk interface 62. Such electrochemical changes can possibly lead to a disruption of disk drive operations, especially with higher density disks.

In addition, conventional air bearing systems tend to resonate at a natural oscillating frequency, especially when the head 60 is flying very close to the disk 12. For example, in some disk drives under certain conditions, the head will move towards and away from the disk (i.e., in the z-direction) at a frequency of approximately 200 KHz. Such head oscillations can lead to unpredictable behavior of the disk drive.

Accordingly, a need exists for a disk drive with a dual element transducer that reduces the likelihood of a potential difference at the head/disk interface, monitors flying height during a write operation so that appropriate measures can be taken when high fly writing occurs, and/or controls flying height to reduce high fly writing and/or head oscillations.

RELATED ART

A number of systems are designed to detect, control, and/or compensate for variations in flying height.

One such flying height control system is referred to as a tail-trigger system. A tail-trigger system employs a piezo-electric transducer (PZT) mounted on the slider. Activation of the PZT causes the head to move up and down relative to the disk.

Another flying height control system is referred to as a DC capacitive adjust system. A DC capacitive adjust system establishes a DC voltage at the head/disk interface. The DC voltage causes the head to move towards the disk. Adjusting the DC voltage based on a signal indicative of flying height can cause the flying height to stay at a desired flying height. However, the DC voltage applied to the head/disk interface can polarize the head/disk interface. Polarization of the head/disk interface can alter the characteristics of the read and write system and is thus undesirable. In addition, the use of a DC voltage requires a direct galvanic connection between the voltage source and the slider, which is difficult to form for manufacturing reasons.

A system for monitoring the flying height of a dual element transducer is disclosed in U.S. Pat. No. 6,452,735. The '735 patent determines flying height by monitoring a thermally induced signal generated by the read element during a write operation. When a high fly write condition is detected, the data is rewritten.

SUMMARY OF THE INVENTION

In accordance with the present invention, a disk drive contains an AC exciter. Generally speaking, the AC exciter comprises the head and the disk of a conventional disk drive and an AC power source connected between the head and the disk. The AC power source establishes an AC exciter signal across a head/disk interface defined by the head and the disk.

In one embodiment, the present invention may be configured as an electrostatic discharge system or method. The AC exciter signal at the head/disk interface discharges electrostatic charge that may accumulate on one or both of the head and the disk. Discharging accumulated electrostatic charge preserves the electrochemical properties of the head and the disk.

In another embodiment, the present invention may be configured as a flying height sense system or method. The head/disk interface may be modeled electrically as a variable capacitor. The capacitance of the head/disk interface varies with the dimensions of a flying height gap defined at the head/disk interface. The AC exciter signal applied across the flying height gap can be used to determine the head/disk capacitance at any point in time. For example, the AC exciter may comprise a current detect circuit for generating a gap current signal indicative of the current through the head/disk interface. The gap current signal is related to the head/disk capacitance and thus can be used as a flying height signal indicative of head flying height. The flying height signal can be used to control write operations or can be used as a feedback signal for a feedback system for controlling the flying height of the head.

In yet another embodiment, the present invention may be configured as a flying height control system or method. The application of the AC exciter signal across the head/disk interface creates an attraction force between the head and the disk. Altering the AC exciter signal increases or decreases the head/disk attraction force and causes the head to move towards the disk against the cumulative preload forces that bias the head away from the disk. Accordingly, the AC exciter can be used as part of a feedback system for controlling the flying height of the head. The reaction time of the feedback system is sufficiently fast to damp oscillations of the air bearing system that supports the head.

The present invention may be implemented as part of a system incorporating any one of the embodiments described herein. Furthermore, the present invention has application in a flying height control system that generates the AC exciter signal across the head/disk interface based on a flying height signal that is generated based on the head/disk capacitance. Such a system will inherently have the advantage of discharging any electrostatic charge that may accumulate at the head/disk interface.

These and other objects, features, embodiments, and advantages of the invention will be apparent from the following description taken in conjunction with the following drawings.

BRIEF DESCRIPTION OF THE DRAWINGS

FIGS. 8 and 8A are a schematic block diagrams of the present invention configured as a flying height sense system;

FIG. 9 is a schematic block diagram of the present invention configured as a first exemplary flying height control system;

FIG. 10 is a schematic block diagram of the present invention configured as a second exemplary flying height control system;

FIG. 11 is a schematic block diagram of the present invention configured as a first exemplary disk drive;

FIG. 12 is a schematic block diagram of the present invention configured as a second exemplary disk drive;

FIG. 13 is a schematic block diagram of the present invention configured as a third exemplary disk drive; and FIG. 14 is a schematic block diagram of the present invention configured as a fourth exemplary disk drive.

DETAILED DESCRIPTION OF THE PREFERRED EMBODIMENTS

The present invention may be embodied in a number of different configurations depending upon the requirements of the disk drive in which it is implemented. A number of different examples of each of these configurations will be discussed below.

I. ELECTROSTATIC DISCHARGE SYSTEMS

Figure 1:
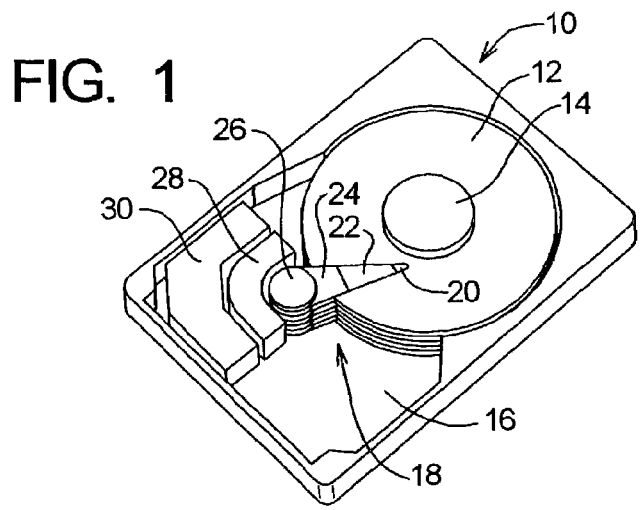
FIG. 1 is a perspective view of a conventional disk drive.
Figure 2:
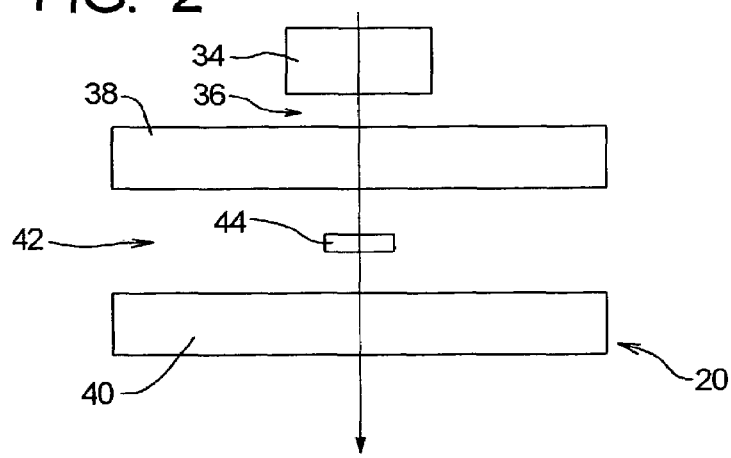
FIG. 2 is a diagrammatic representation of an air bearing surface of a transducer.
Figure 3:
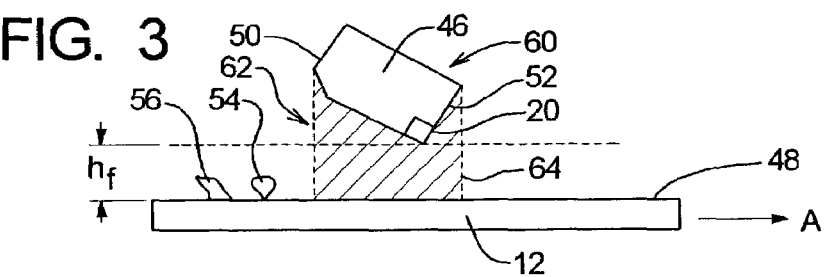
FIG. 3 is a simplified diagrammatic representation of a slider flying over a disk surface at a nominal flying height.
Figure 4:
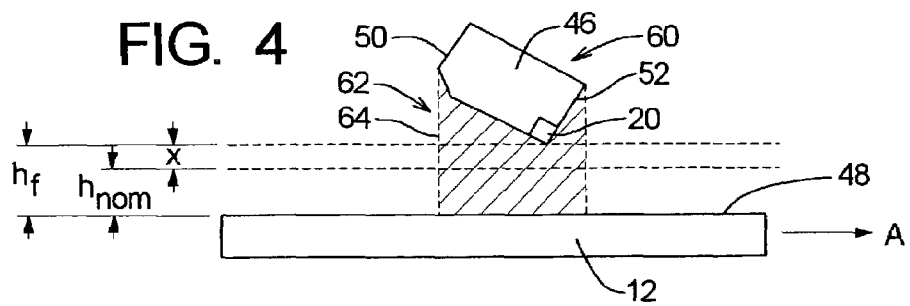
FIG. 4 is a simplified diagrammatic representation of a slider flying over a disk surface at an actual flying height greater than its nominal flying height.
Figure 5:
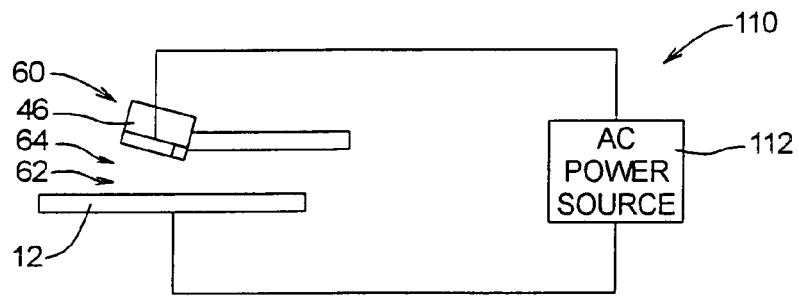
FIG. 5 is a schematic block diagram of the present invention configured as a first exemplary electrostatic discharge system.

FIG. 5 illustrates a block diagram of first exemplary electrostatic discharge system 110 constructed in accordance with and embodying the principles of the present invention. The electrostatic discharge system 110 comprises an AC power source 112, and the head 60 and the disk 12 of a conventional disk drive 10.

The AC power source 112 generates an AC exciter signal and is operatively connected to the head 60 and the disk 12. More specifically, the AC power source 112 is connected to the disk 12 and to the slider 46 of the head 60 such that an AC electric potential is created across the flying height gap 64 at the head/disk interface 62. By creating an alternating current electric potential across the flying height gap 64, the electrostatic discharge system 110 inhibits the accumulation of electrostatic charge on either the head 60 or the disk 12.

Figure 6:
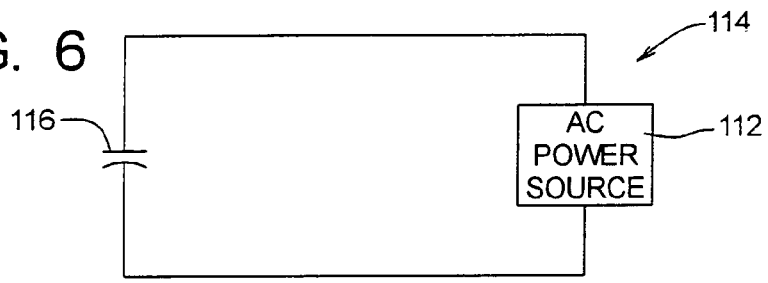
FIG. 6 is a schematic block diagram of an equivalent circuit representing the electrostatic discharge system of FIG. 5.

FIG. 6 illustrates an equivalent circuit 114 for the electrostatic discharge system 110. A capacitor 116 in the equivalent circuit 114 represents the effective capacitance of the disk 12, the slider 46, and the flying height gap 64. The capacitor 116 is considered variable in that a change of the relative positions of the disk 12 and the slider 46 will change the dimensions of the flying height gap 64 and alter the effective capacitance of the head/disk interface 62.

Figure 7:
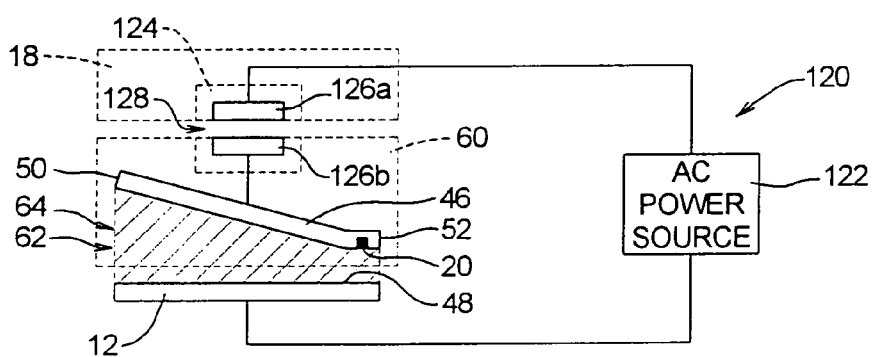
FIG. 7 is a schematic block diagram of the present invention configured as a second exemplary electrostatic discharge system.

FIG. 7 illustrates a block diagram of a second exemplary electrostatic discharge system 120 of the present invention. The electrostatic discharge system 120 comprises an AC power source 122, a capacitive coupler 124, and the actuator arm assembly 18, the head 60 and the disk 12 of the disk drive 10.

The capacitive coupler 124 comprises first and second coupler plates 126a and 126b separated by a coupler gap 128. The first coupler plate 126a is mounted on the actuator arm assembly 18, while the second coupler plate 126b is mounted on the head 60. The capacitive coupler 124 allows the AC exciter signal to be transmitted from the actuator arm assembly 18 to the head 60 without a direct galvanic connection. The capacitive coupler 124 is advantageous in disk drives in which manufacturing considerations make a direct galvanic connection between the actuator arm assembly 18 and the head 60 difficult to implement.

Accordingly, the AC power source 122 is operatively connected to the disk 12 and to the head 60 through the capacitive coupler 124. The AC exciter signal is thus applied to the head 60 and the disk 12 such that an AC electric potential is created across the flying height gap 64 at the head/disk interface 62. By creating an electric potential across the flying height gap 64, the electrostatic discharge system 120 inhibits the accumulation of electrostatic charge on either the head 60 or the disk 12 in a manner similar to the electrostatic discharge system 110.

The capacitive coupler 124 has application to any system that employs an AC exciter signal across the head/disk interface 62. For example, a capacitive coupler similar to the capacitive coupler 124 may be used in the flying height sense systems, flying height control systems, and disk drives described below.

The parameters of the AC exciter signal used by the electrostatic discharge systems 110 and 120 will be selected based on the requirements of a particular disk drive design. More specifically, the AC exciter signal is defined by parameters including waveform shape, duty cycle, frequency, and amplitude. The shape of the AC exciter signal waveform may be a square wave with a fifty percent duty cycle. However, other waveforms, including trapezoidal, sinusoidal, asymmetric waveforms, and other duty cycles may be used for a particular disk drive configuration to compensate for potential differences at the head/disk interface 62.

In addition, the AC exciter signal may include a DC offset in addition to an AC signal. At low flying heights, a built-in work function difference between the head 60 and the disk 12 can be as much as 0.5V, which can cause an attraction between the head 60 and the disk 12. The DC offset could neutralize the built-in work function difference such that the AC signal has a simple, predictable effect. The use of the capacitive coupler 124 would, however, prevent the use of an AC exciter signal having a DC offset.

The frequency of the AC exciter signal is not critical, but should be outside the data band to prevent interference with the transmission of read and write data between the transducer 20 and the drive electronics 30. The frequency of the AC exciter signal should also be offset from the natural frequency of the air bearing system to avoid unintentional harmonic excitation of the air bearing system. The frequency of the AC exciter signal should also be tuned to the capacitor 116 representing the capacitance of the head/disk interface 62.

The exact parameters of the AC exciter signal are not critical in the context of an electrostatic discharge system, but should be sufficient to discharge any accumulated electrostatic charge. However, the amplitude should not be large enough either to cause unintended movement of the head 60 towards the disk 12 or to cause an electrochemical breakdown of the transducer 20 or the disk 12.

While the characteristics of the AC exciter signal may be fixed in advance, these characteristics may also be adjusted in response to detected system parameters during operation of the disk drive 10. For example, the AC exciter signal may be turned off (held at zero) or generated with a very low duty cycle until a system parameter associated with the accumulation of electrostatic charge on the head 60 or the disk 12 (e.g., read signal strength or distortion) is detected. At that point, the duty cycle and/or amplitude of the AC exciter signal may be increased as necessary to discharge any accumulated electrostatic charge.

II. FLYING HEIGHT SENSE SYSTEMS

Figure 8:
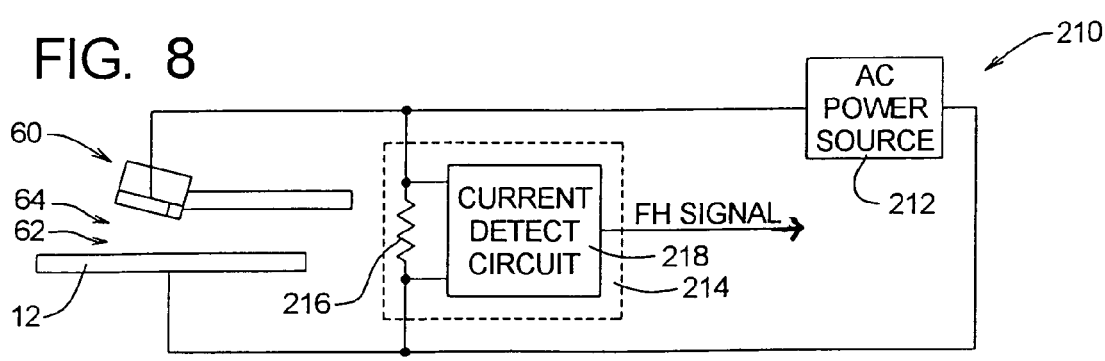

FIG. 8 illustrates a block diagram of an exemplary flying height sense system 210 constructed in accordance with and embodying the principles of the present invention. The flying height sense system 210 comprises an AC power source 212, a capacitance sense circuit 214, and the head 60 and the disk 12 of a conventional disk drive such as the disk drive 10.

The disk 12, the slider 46 and the flying height gap 64 define an effective capacitance at the head/disk interface 62 that changes with changing relative positions of the head 60 and the disk 12. In particular, a capacitor is formed by any two conductive plates (electrodes) separated by insulating material referred to as dielectric. The head 60 and the disk 12 are conductive plates that are separated by a dielectric (air) and thus form a capacitor. The formula for determining capacitance is as follows:

$$C = (0.224 * K * A)/t, \text{ where} \tag{1}$$

C=capacitance in picofarads
K=dielectric constant (1.0006 for air)
A=area of plates in square inches t=separation between the two plates in inches
0.0884=conversion constant for centimeters The application of formula (1) to the head/disk interface 62 is somewhat complicated by the non-planar shape of the head 60. However, one of ordinary skill in the art would be capable of calculating capacitance even for such non-planar shapes using formula (1). In addition, this capacitance can easily be empirically detected. The term "t" in formula (1) is directly related to actual flying height $h_f$.

The relative positions of the head 60 and the disk 12 thus determine the actual flying height $h_f$. The effective capacitance of the head/disk interface 62 is therefore directly related to, and can be used to calculate, the actual flying height $h_f$. The term "head/disk capacitance" refers to the effective capacitance at the head/disk interface 62 or other parameters/characteristics indicative of this effective capacitance.

The association between head/disk capacitance and flying height can be represented using a flying height detection scheme based on formulas, tables, ranges, and/or thresholds generated in many different ways. For example, a flying height detection scheme may be generated based on empirical testing of a particular disk drive configuration. In this case, the actual head/disk capacitance can be measured in the laboratory or during manufacturing for the entire range of actual flying heights expected, based upon the characteristics of the disk drive design.

Empirical data may be used to plot discrete points on a table associating head/disk capacitance with flying height. Alternatively, the empirical data may used to determine a formula associating head/disk capacitance with flying height. Yet another method would be simply to determine from the empirical data a head/disk capacitance indicative of the greatest possible flying height associated with reliable write operations.

Another possibility is to develop a flying height detection scheme based on the geometry, spatial relationships, and material composition of relevant portions of the head/disk interface. Calculated head/disk capacitances may be associated by a table, formula, and/or threshold with acceptable flying heights.

In particular, the head/disk capacitance for a given flying height can be calculated based on such known factors as the materials from which the disk 12 and the components of the head 60 are made, the geometric shapes of the disk 12 and the head 60 at the head/disk interface 62, and the angular and spatial relationship between the head 60 and the disk 12 as the head 60 moves within its entire range of movement relative to the disk 12.

Yet another possibility is to create a flying height detection scheme based on signal strength during read operations. More specifically, it is well known that an important factor in read signal strength is flying height. Given the relationship between read signal strength and flying height, it can be presumed that acceptable read signal strength is associated with acceptable flying height values, even if the actual flying height is not known by measurement or calculation. Head/disk capacitances associated with acceptable read signal strength may be stored as a table, formula, and/or threshold that may subsequently be used to determine flying height or whether flying height is acceptable.

If flying height is associated with head/disk capacitance using a table, actual flying height is determined as follows. During normal operation of the disk drive, the head/disk capacitance is detected and compared with the capacitance in the table. The flying height associated with the detected head/disk capacitance is presumed to be the actual flying height, with interpolation used to determine intermediate values. If flying height is associated with head/disk capacitance using a formula, actual flying height is calculated based on a value indicative of the head/disk capacitance and the formula.

The capacitance sense circuit 214 may be any system capable of determining head/disk capacitance. In the exemplary flying height sense system 210, the capacitance sense circuit 214 generates an FH signal indicative of flying height. The FH signal may directly correspond to flying height but is more likely to be associated with a parameter, such as a current or voltage, indicative of head/disk capacitance. Stated differently, an actual calculation of flying height is less important than having a signal associated with flying height that can be used to monitor read and write operations or to control flying height.

The capacitance sense circuit 214 comprises a sense resistor 216 and a current detect circuit 218. The sense resistor 216 is arranged in parallel with the head/disk interface 62 such that a sense current flowing through the sense resistor 216 is proportional to a gap current flowing through the head/disk interface 62. The current detect circuit 218 generates the FH signal based on the AC exciter signal and the sense current flowing through the sense resistor 216. The head/disk capacitance, and thus the flying height $h_f$, may be calculated by the current detect circuit 218 based on the FH signal. Alternatively, the current detect circuit 218 may generate the FH signal based only on the sense current, and the head/disk capacitance and/or flying height $h_f$ can be remotely calculated, if necessary, based on the FH signal and the AC exciter signal.

FIG. 8A illustrates a block diagram of an exemplary flying height sense system 210a constructed in accordance with the principles of the present invention. The flying height sense system 210a comprises an AC power source 212, a capacitance sense circuit 214a, and the head 60 and the disk 12 of a conventional disk drive such as the disk drive 10.

The capacitance sense circuit 214a comprises a sense resistor 216a and a voltage detect circuit 218a. The sense resistor 216a is arranged in series with the head/disk interface 62 such that a sense voltage flowing through the sense resistor 216a is proportional to a gap current flowing through the head/disk interface 62. The voltage detect circuit 218a generates the FH signal based on the AC exciter signal and the sense voltage across the sense resistor 216.

As another alternative to the capacitance sense circuit 214, a current transformer or other indirect method of sensing the head/disk capacitance may be used. As yet another alternative, the head/disk capacitance may be directly detected using a capacitance measurement circuit having a separate voltage source. In this case, the AC exciter signal may momentarily or periodically be turned off to allow the capacitance measurement circuit to detect the head/disk capacitance. In any case, the FH signal can be an analog signal or can be a digitized signal as appropriate for the drive electronics 30.

Accordingly, the flying height sense system 210 uses the head/disk capacitance, or some characteristic or parameter representative of this capacitance, to generate a signal indicative of actual flying height at any point in time. Knowledge of the relationship between head/disk capacitance and flying height can be used in a number of ways as will be described in further detail below.

The parameters of the AC exciter signal used by the flying height sense system 210 will be selected based on the requirements of a particular disk drive design. As discussed above, the AC exciter signal is defined by parameters including waveform shape, duty cycle, frequency, and amplitude. In the context of the flying height sense system 210, the shape of the AC exciter signal waveform is preferably a square wave with a fifty percent duty cycle. Other waveforms, including trapezoidal, sinusoidal, asymmetric waveforms, and other duty cycles may be used for a given disk drive 10. In addition, the AC exciter may also include a DC offset signal to neutralize any work function difference between the head 60 and the disk 12.

The frequency of the AC exciter signal is not critical, but should be outside the data band to prevent interference with the transmission of read and write data between the transducer 20 and the drive electronics 30. The frequency of the AC exciter signal should also be offset from the natural frequency of the air bearing system to avoid unintentional excitation of the air bearing system. The frequency of the AC exciter signal should also be tuned to the head/disk capacitance. The AC power source 212 generates an AC exciter signal having a frequency in a first preferred range of approximately 300 KHz to 2 MHz and should be within a second preferred range of at least approximately 200 KHz.

The exact amplitude of the AC exciter signal is also not critical in the context of a flying height sense system. The AC exciter signal should, however, be kept as low as possible to avoid either unintended movement of the head 60 towards the disk 12 or an electrochemical breakdown of the transducer 20 or the disk 12. The AC power source 212 generates an AC exciter signal having an amplitude within a first preferred range of approximately 0.1 to 0.5 volts and should be within a second preferred range of less than approximately 1 volt.

While the characteristics of the AC exciter signal may be fixed in advance, these characteristics may be also adjusted in response to detected system parameters during operation of the disk drive 10. For example, the AC exciter signal may be turned off (held at zero) or generated with a very low duty cycle until certain conditions are met. For example, the AC exciter signal may be turned off during read operations and on during write operations to detect high fly write errors.

III. FLYING HEIGHT CONTROL SYSTEMS

FIG. 9 illustrates a block diagram of an exemplary flying height control system 310 constructed in accordance with and embodying the principles of the present invention. The flying height control system 310 comprises an AC power source 312, a capacitance sense circuit 314, a flying height control circuit 316, and the head 60 and the disk 12 of a conventional disk drive such as the disk drive 10.

The flying height control circuit 316 controls the AC exciter signal based on the FH signal to maintain a predetermined spatial relationship between the head 60 and the disk 12. In particular, the capacitance sense circuit 314 generates the FH signal. The flying height of the head 60 at any point in time is represented by, or may be calculated from, the FH signal. The flying height control circuit 316 is additionally coupled to the AC power source 312 to control at least one parameter of the AC exciter signal.

The AC exciter signal establishes a head/disk attraction force between the head 60 and the disk 12. In particular, establishing an electric potential between the head 60 and the disk 12 across the head/disk gap 64 creates a force that, in the context of a fixed disk 12 and the head 60 suspended from the actuator arm assembly 18, moves the head 60 towards the disk 12. The following formula defines the relationship between head/disk attraction force and the head 60 and the disk 12:

$$F=(\epsilon^* A^* v^2)/(2^* g^2), \text{ where} \tag{2}$$

F=force in newtons

A=area of plates in square meters v=voltage g=length of gap between plates in meters $\epsilon$=8.8e−12 F/m As shown in formula (2), the magnitude of this head/disk attraction force is proportional to the inverse square of the distance between the head 60 and the disk 12. Accordingly, although the trailing edge 52 of the slider 46 represents a relatively small portion of the surface area of the slider 46, the trailing edge 52 is closer to the disk surface 48 and thus contributes a greater proportion of the head/disk attraction force. While a slider design may be optimized for creation of the head/disk attraction force, acceptable head/disk attraction forces can be established with conventional slider designs.

Formula (2) also shows that, by changing the AC exciter signal, the head/disk attraction force may be controlled. By controlling the head/disk attraction force, the distance between the head 60 and the disk 12, or flying height $h_f$, may also be controlled.

Although the force between the head 60 and the disk 12 created by the AC exciter signal is attractive, this force can be used to cause movement of the head 60 in either direction relative to the disk 12. In particular, the AC exciter signal may be altered (i.e., increased amplitude and/or duty cycle) to increase the attraction force and thus draw the head 60 towards the disk 12. However, the AC exciter signal may also be altered (i.e., decreased amplitude and/or duty cycle) to decrease the attraction force between the head 60 and the disk 12, which allows the air bearing system to force the head 60 away from the disk 12.

Accordingly, when the AC exciter signal is controlled based on a signal corresponding to flying height, the flying height control circuit 316 forms a control portion of a feedback loop that, within predetermined loop parameters, maintains the flying height $h_f$ at the desired nominal value $h_{nom}$ or within a range of acceptable flying height values defined by the nominal value $h_{nom}$.

The details of the flying height control circuit 316 depend upon the characteristics of a particular disk drive configuration. In the flying height control system 310, the FH signal represents the actual flying height of the head 60 relative to the disk 12. The FH signal is added to an input signal corresponding to a desired flying height to generate an error signal indicative of deviation from the desired flying height. The input signal can be predetermined in advance by calculation or empirically in the factory or laboratory. Alternatively, the input signal can be calculated as the disk drive is used based on an indicator of acceptable flying height such as signal strength during read operations. The design of the flying height control circuit 316 for a particular disk drive configuration is well within the expertise of one of ordinary skill in the art.

The capacitance sense circuit 314 and the flying height control circuit 316 can be formed by analog components, digital components, or a digital signal processor capable of performing the measurements and calculations described above. In addition, the functions of the circuits 314 and 316 may be implemented either as a stand alone subsystem or may be integrated into existing signal processing circuits of the drive electronics 30.

FIG. 10 illustrates another exemplary flying height control system 320 of the present invention. The flying height control system 320 comprises a flying height control circuit 324 similar to the flying height control circuit 316. However, in the flying height control system 320, the FH signal corresponding to flying height is generated by an outside source and is not based on the head/disk capacitance.

More specifically, when configured as a flying height control system, the present invention may control flying height based on any signal from which a deviation of actual flying height from a desired flying height can be detected. For example, a signal indicative of flying height may be generated based on the strength of the analog read signal during read operations. The characteristics of a thermally-induced signal generated by the read element during a write operation have also been found to be indicative of flying height. Any signal indicative of flying height may be used as the FH signal in the flying height control system 320.

The parameters of the AC exciter signal used by the flying height control systems 310 and 320 will be selected based on the requirements of a particular disk drive design. As discussed above, the AC exciter signal is defined by parameters including waveform shape, duty cycle, frequency, and amplitude.

In the context of a flying height control system such as the systems 310 and 320, the shape of the AC exciter signal waveform is preferably a square wave. A square wave provides maximum attraction force with minimum peak voltage. Other waveforms, including trapezoidal, sinusoidal, asymmetric waveforms, and other duty cycles may be used, however, depending upon the characteristics of a given disk drive 10. In addition, the AC exciter signal may also include a DC offset signal to neutralize any work function difference between the head 60 and the disk 12.

The frequency of the AC exciter signal is not critical, but should be outside the data band to prevent interference with the transmission of read and write data between the transducer 20 and the drive electronics 30. The frequency of the AC exciter signal should also be higher than the natural frequency of the air bearing system. Thus, the flying height control systems 310 and 320 have the additional benefit of reacting quickly enough to damp unintended oscillations of the air bearing system at its natural frequency. The frequency of the AC exciter signal should also be tuned to the head/disk capacitance. The AC power source 312 generates an AC exciter signal having a frequency in a first preferred range of approximately 300 KHz to 2 MHz and should be within a second preferred range of at least approximately 200 KHz.

To control the attraction forces between the head 60 and the disk 12, the flying height control circuit 324 is most likely to alter one or both of the amplitude and the duty cycle of the AC exciter signal. The amplitude and/or duty cycle of the AC exciter signal will determine the attraction forces at the head/disk interface 62. The amplitude of the AC exciter signal should, however, be kept as low as possible to avoid an electrochemical breakdown of the transducer 20 or the disk 12, while still obtaining desired movement of the head 60 towards the disk 12.

A typical flying height control circuit 324 is designed to generate an AC exciter signal, which has a maximum amplitude in a first preferred range of approximately 1 to 5 volts and should be within a second preferred range of no more than 5 volts.

IV. DISK DRIVES

FIGS. 11–14 illustrate simplified block diagrams of exemplary disk drives constructed in accordance with and embodying the principles of the present invention.

FIG. 11 illustrates a disk drive 410 comprising an AC power source 412, and the head 60, the disk 12, the spindle motor 14, the voice coil motor 28, and the drive electronics 30 of a conventional disk drive such as the disk drive 10. The AC power source 412 is configured to apply an AC exciter signal to the head/disk interface 62 to discharge electrostatic charge on the head 60 and/or the disk 12. The parameters of the AC exciter signal are similar to those of the AC exciter signal generated by the electrostatic discharge systems 110 and 120.

FIG. 12 depicts a disk drive 420 comprising an AC power source 422 and a capacitance sense circuit 424 in addition to the head 60, the disk 12, the spindle motor 14, the voice coil motor 28, and the drive electronics 30 of a conventional disk drive such as the disk drive 10. The capacitance sense circuit 424 generates an FH signal indicative of the head/disk capacitance. As described above, the head/disk capacitance corresponds to the spatial relationship of the head 60 relative to the disk 12, so the FH signal is indicative of flying height $h_f$ at any point in time.

The FH signal is applied to the drive electronics 30. The drive electronics 30 can use the FH signal to control read and write operations. For example, if the disk drive 420 is writing and the FH signal indicates a high fly write condition, the drive electronics 30 can cause the information that was being written at the time the high fly write condition existed to be rewritten on the disk 12. The parameters of the AC exciter signal are similar to those of the AC exciter signal generated by the fly height sense system 210.

FIG. 13 depicts a disk drive 430 comprising an AC power source 432, a capacitance sense circuit 434, and a flying height control circuit 436 in addition to the head 60, the disk 12, the spindle motor 14, the voice coil motor 28, and the drive electronics 30 of a conventional disk drive such as the disk drive 10. The capacitance sense circuit 434 generates the FH signal indicative of head/disk capacitance. As described above, the head/disk capacitance corresponds to the spatial relationship of the head 60 relative to the disk 12, so the FH signal is indicative of flying height $h_f$.

The FH signal is applied to the flying height control circuit 436. The flying height control circuit 436 is connected to the AC power source 432 to control at least one parameter of the AC exciter signal. Preferably, the flying height control circuit 436 controls one or both of the amplitude and the duty cycle of the flying height control circuit 436. The flying height control circuit 436 controls the AC exciter signal based on the FH signal such that the actual flying height of the head 60 relative to the disk 12 is maintained at or near a desired value, or within a desired range, under normal conditions.

FIG. 14 depicts a disk drive 440 comprising an AC power source 442, a capacitance sense circuit 444, and a flying height control circuit 446 in addition to the head 60, the disk 12, the spindle motor 14, the voice coil motor 28, and the drive electronics 30 of a conventional disk drive such as the disk drive 10. The capacitance sense circuit 444 generates a signal FH indicative of head/disk capacitance. As described above, this head/disk capacitance corresponds to the spatial relationship of the head 60 relative to the disk 12, so the FH signal is indicative of flying height $h_f$ at any point in time.

The FH signal is applied to the flying height control circuit 446. The flying height control circuit 446 is connected to the AC power source 442 to control at least one parameter of the AC exciter signal. Preferably, the flying height control circuit 446 controls one or both of the amplitude and the duty cycle of the flying height control circuit 446. These parameters are related to an attraction force between the head 60 and the disk 12. The flying height control circuit 446 controls the AC exciter signal based on the FH signal such that the actual flying height of the head 60 relative to the disk 12 is maintained at or near a desired value, or within an acceptable range, under normal conditions.

In the disk drive 440, the FH signal is also applied to the drive electronics 30. The drive electronics 30 can thus use the FH signal to control read and write operations. For example, if the disk drive 440 is writing and the FH signal indicates a high fly write condition, the drive electronics 30 can rewrite the information that was being written at the time the high fly write condition occurred. Alternatively, the flying height can be adjusted, and the drive electronics 30 can rewrite the information.

V. CONCLUSION

The present invention thus can be implemented in various configurations as necessary for a particular disk drive design. In the embodiments described above, the application of any AC exciter signal across the head/disk interface 62 will discharge electrostatic charge that can accumulate at the head/disk interface 62.

Even a relatively small AC exciter signal applied to the head/disk interface 62 allows detection of fly height. A slightly larger AC exciter signal will also allow control of the attraction force between the head 60 and the disk 12 at the head/disk interface 62. The use of an exciter signal having an AC component as opposed to a DC signal inhibits changes in electrochemical properties of the head 60 and the disk 12 at the head/disk interface 62.

The present invention also allows the flying height of the transducer 20 to be kept within a sufficiently narrow range to allow reliable read and write operations at lower flying heights than possible with prior art air bearing systems.

In addition, by using the principles of the present invention to control flying height, the aerodynamics of the slider 46 become less important and the slider 46 can be designed for other considerations such as accommodating debris and lubricant on the disk surface 48.

The flying height control system of the present invention also allows a standard slider design to be used across a family of disk drives with different operating characteristics.

It will be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

The invention claimed is:

1. A disk drive, comprising:
   a disk for storing information;
   a head suspended adjacent to the disk such that a flying height gap exists at a head/disk interface between the head and the disk, wherein the head comprises a transducer for writing data to and reading data from the disk;
   an AC power source for generating an AC exciter signal, wherein the AC power source is coupled to the head and the disk such that the AC exciter signal is present across the flying height gap;
   a capacitance sense circuit for generating a flying height signal indicative of an effective capacitance between the head and the disk at the head/disk interface in response to the AC exciter signal; and
   a flying height control circuit for controlling the AC power source to generate the AC exciter signal to maintain a flying height of the head with respect to the disk within a range of acceptable flying heights.

2. A disk drive as recited in claim 1, in which the AC exciter signal discharges electrostatic charge on at least one of the head and the disk.

3. A disk drive as recited in claim 1, in which the AC exciter signal discharges electrostatic charge on the head and the disk.

4. A disk drive as recited in claim 3, further comprising a flying height control circuit for controlling the AC power source based on the flying height signal to generate the AC exciter signal to alter an attraction force between the head and the disk.

5. A disk drive as recited in claim 3, further comprising a controller for controlling the transducer to read data from and write data to the disk based on the flying height signal.

6. A disk drive as recited in claim 1, further comprising a flying height control circuit for controlling the AC power source to generate the AC exciter signal to alter an attraction force between the head and the disk.

7. A disk drive as recited in claim 6, in which the flying height control circuit controls the AC power source to alter at least one of an amplitude and a duty cycle of the AC exciter signal to alter the attraction force between the head and the disk.

8. A disk drive as recited in claim 1, in which a parameter of the AC exciter signal is based on a characteristic of the disk drive.

9. A disk drive as recited in claim 1, further comprising a capacitive coupler electrically connected between the AC power source and the head, wherein the capacitive coupler includes a first coupler plate mounted on an actuator arm assembly and a second coupler plate mounted on the head.

10. A disk drive as recited in claim 1, in which:
    the head further comprises a slider; and
    movement of the disk relative to the head causes air to engage the slider to form an air bearing system that forces the head away from the disk to create the flying height gap at the head/disk interface.

11. A disk drive as recited in claim 10, in which a frequency of the AC exciter signal is offset from a natural oscillating frequency associated with the air bearing system.

12. A disk drive as recited in claim 1, in which a frequency of the AC exciter signal is offset from a data band defined by transmission of data to and from the transducer.

13. A disk drive as recited in claim 1, in which a maximum amplitude of the AC exciter signal is based on characteristics of the head and the disk at the head/disk interface.

14. A disk drive as recited in claim 1, in which a shape of the AC exciter signal is selected from the group consisting of substantially square, substantially trapezoidal, and substantially sinusoidal.

15. A disk drive as recited in claim 14, in which a duty cycle of the AC exciter signal is approximately fifty percent.

16. A disk drive, comprising:
    a disk for storing information;
    a head comprising a slider and a transducer for writing data to and reading data from the disk;
    an actuator arm assembly for suspending the head adjacent to the disk, wherein rotation of the disk causes air to engage the slider to create a flying height gap at a head/disk interface between the head and the disk;

an AC power source coupled to the head and the disk for generating an AC exciter signal across the flying height gap; and a capacitance sense circuit for sensing a head/disk capacitance at the head/disk interface in response to the AC exciter signal, wherein movement of the disk relative to the head causes air to engage the slider to form an air bearing system that forces the head away from the disk to create the flying height gap at the head/disk interface; and a frequency of the AC exciter signal is offset from a natural oscillating frequency associated with the air bearing system.

17. A disk drive as recited in claim 16, in which the capacitance sense circuit further generates a flying height signal indicative of the head/disk capacitance.

18. A disk drive as recited in claim 17, in which a flying height of the head relative to the disk is calculated based on the flying height signal and a predetermined relationship between flying height and head/disk capacitance.

19. A disk drive as recited in claim 17, further comprising a controller for controlling the transducer to read data from and write data to the disk based on the flying height signal.

20. A disk drive as recited in claim 17, further comprising a controller for moving the head to a parking location on a ramp based on the flying height signal.

21. A disk drive as recited in claim 16, in which a frequency of the AC exciter signal is offset from a data band defined by transmission of data to and from the transducer.

22. A disk drive as recited in claim 16, in which the capacitance sense circuit comprises:

a sense resistor electrically connected in parallel with the head/disk interface; and a current detect circuit for detecting a sense current through the sense resistor.

23. A disk drive as recited in claim 16, further comprising a capacitive coupler electrically connected between the AC power source and the head, wherein the capacitive coupler includes a first coupler plate mounted on the actuator arm assembly and a second coupler plate mounted on the head.

24. A disk drive, comprising:

a disk for storing information;

a head comprising a slider and a transducer for writing data to and reading data from the disk;

an actuator arm assembly for suspending the head adjacent to the disk, wherein rotation of the disk causes air to engage the slider to create a flying height gap at a head/disk interface between the head and the disk;

an AC power source coupled to the head and the disk for generating an AC exciter signal across the flying height gap; and a flying height control circuit for controlling the AC power source to generate the AC exciter signal to alter an attraction force between the head and the disk, thereby altering a flying height of the head relative to the disk, wherein a frequency of the AC exciter signal is offset from a data band defined by transmission of data to and from the transducer.

25. A disk drive as recited in claim 24, in which the flying height control circuit controls the AC power source to generate the AC exciter signal to maintain the flying height within a range of acceptable flying heights.

26. A disk drive as recited in claim 24, further comprising a capacitance sense circuit for generating a flying height signal indicative of an effective capacitance between the head and the disk at the head/disk interface in response to the AC exciter signal, wherein the flying height control circuit controls the AC power source to generate the AC exciter signal based on the flying height signal.

27. A disk drive as recited in claim 26, further comprising a controller for controlling the transducer to read data from and write data to the disk based on the flying height signal.

28. A disk drive as recited in claim 24, in which:

movement of the disk relative to the head causes air to engage the slider to form an air bearing system that forces the head away from the disk to create the flying height gap at the head/disk interface; and the attraction force opposes the force applied on the head by the air bearing system.

29. A disk drive as recited in claim 28, in which a frequency of the AC exciter signal is offset from a natural oscillating frequency associated with the air bearing system.

30. A disk drive as recited in claim 28, in which a frequency of the AC exciter signal avoids harmonic excitation of the air bearing system.

31. A disk drive as recited in claim 24, in which the flying height control circuit controls an amplitude of the AC exciter signal to alter the attraction force between the head and the disk.

32. A disk drive as recited in claim 24, in which the flying height control circuit controls a duty cycle of the AC exciter signal to alter the attraction force between the head and the disk.

33. A disk drive as recited in claim 24, in which a shape of the AC exciter signal is selected from the group consisting of substantially square, substantially trapezoidal, and substantially sinusoidal.

34. A disk drive, comprising:

a disk for storing information;

a head comprising a slider and a transducer for writing data to and reading data from the disk;

an actuator arm assembly for suspending the head adjacent to the disk;

a spindle motor for rotating the disk to cause air to engage the slider to form an air bearing system that forces the head away from the disk to form a flying height gap at a head/disk interface between the head and the disk; and an AC power source coupled to the head and the disk for establishing an AC exciter signal across the flying height gap, wherein a frequency of the AC exciter signal is offset from a data band defined by transmission of data to and from the transducer.

35. A disk drive as recited in claim 34, in which the AC exciter signal discharges electrostatic charge on at least one of the head and the disk.

36. A disk drive as recited in claim 34, further comprising a capacitance sense circuit for sensing a head/disk capacitance at the head/disk interface in response to the AC exciter signal and for generating a flying height signal indicative of an effective capacitance between the head and the disk at the head/disk interface.

37. A disk drive as recited in claim 36, further comprising a flying height control circuit for controlling the AC power source based on the flying height signal to generate the AC exciter signal to alter an attraction force between the head and the disk.

38. A disk drive as recited in claim 36, further comprising a controller for controlling the transducer to read data from and write data to the disk based on the flying height signal.

39. A disk drive as recited in claim 36, in which a flying height of the head relative to the disk is calculated based on the flying height signal and a predetermined relationship between flying height and head/disk capacitance.

40. A disk drive as recited in claim 36, further comprising a controller for controlling the transducer to read data from and write data to the disk based on the flying height signal.

41. A disk drive as recited in claim 36, further comprising a controller for moving the head to a parking location on a ramp based on the flying height signal.

42. A disk drive as recited in claim 36, in which a frequency of the AC exciter signal is offset from a natural oscillating frequency associated with the air bearing system.

43. A disk drive as recited in claim 36, in which a frequency of the AC exciter signal avoids harmonic excitation of the air bearing system.

44. A disk drive as recited in claim 36, in which the capacitance sense circuit comprises:
   a sense resistor electrically connected in parallel with the head/disk interface; and
   a current detect circuit for detecting a sense current through the sense resistor.

45. A disk drive as recited in claim 36, further comprising a capacitive coupler electrically connected between the AC power source and the head, wherein the capacitive coupler includes a first coupler plate mounted on the actuator arm assembly and a second coupler plate mounted on the head.

46. A disk drive as recited in claim 34, further comprising a flying height control circuit for controlling the AC power source to generate the AC exciter signal to alter an attraction force between the head and the disk.

47. A disk drive as recited in claim 46, in which the flying height control circuit controls the AC power source to alter at least one of an amplitude and a duty cycle of the AC exciter signal to alter the attraction force between the head and the disk.

48. A disk drive as recited in claim 46, in which the flying height control circuit controls the AC power source to generate the AC exciter signal to maintain the flying height within a range of acceptable flying height values.

49. A disk drive as recited in claim 46, further comprising a capacitance sense circuit for generating a flying height signal indicative of an effective capacitance between the head and the disk at the head/disk interface in response to the AC exciter signal, wherein the flying height control circuit controls the AC power source to generate the AC exciter signal based on the flying height signal.

50. A disk drive as recited in claim 46, further comprising a controller for controlling the transducer to read data from and write data to the disk based on the flying height signal.

51. A disk drive as recited in claim 46, in which the attraction force opposes the force applied on the head by the air bearing system.

52. A disk drive as recited in claim 46, in which a frequency of the AC exciter signal is offset from a natural oscillating frequency associated with the air bearing system.

53. A disk drive as recited in claim 46, in which a frequency of the AC exciter signal avoids harmonic excitation of the air bearing system.

54. A disk drive as recited in claim 46, in which the flying height control circuit controls au amplitude of the AC exciter signal to alter the attraction force between the head and the disk.

55. A disk drive as recited in claim 46, in which the flying height control circuit controls a duty cycle of the AC exciter signal to alter the attraction force between the head and the disk.

56. A disk drive as recited in claim 46, in which the flying height control circuit controls at least one of a duty cycle and an amplitude of the AC exciter signal to alter the attraction force between the head and the disk.

57. A disk drive as recited in claim 46, in which a shape of the AC exciter signal is selected from the group consisting of substantially square, substantially trapezoidal, and substantially sinusoidal.

58. A disk drive as recited in claim 34, further comprising a flying height control circuit for controlling the AC power source to generate the AC exciter signal to maintain a flying height between the head and the disk within a range of acceptable flying heights.

59. A disk drive as recited in claim 34, in which a parameter of the AC exciter signal is based on a characteristic of the disk drive.

60. A disk drive as recited in claim 34, further comprising a capacitive coupler electrically connected between the AC power source and the head, wherein the capacitive coupler includes a first coupler plate mounted on the actuator arm assembly and a second coupler plate mounted on the head.

61. A disk drive as recited in claim 34, in which a frequency of the AC exciter signal is offset from a natural oscillating frequency associated with the air bearing system.

62. A disk drive as recited in claim 34, in which a frequency of the AC exciter signal avoids harmonic excitation of the air bearing system.

63. A disk drive as recited in claim 34, in which a maximum amplitude of the AC exciter signal is based on characteristics of the head and the disk at the head/disk interface.

64. A disk drive as recited in claim 34, in which a shape of the AC exciter signal is selected from the group consisting of substantially square, substantially trapezoidal, and substantially sinusoidal.

65. A disk drive as recited in claim 64, in which a duty cycle of the AC exciter signal is approximately fifty percent.

66. A disk drive as recited in claim 34, in which a DC offset of the AC exciter signal alters an attraction force between the head and the disk.

67. A method for operating a disk drive, wherein the disk drive comprises a disk for storing information, a head comprising a slider and a transducer for writing data to and reading data from the disk, and an AC power source coupled to the head and the disk, the method comprising the steps of:
   suspending the head relative to the disk;
   rotating the disk to cause air to engage the slider to create a flying height gap at a head/disk interface between the head and the disk;
   generating an AC exciter signal across the flying height gap using the AC power source, wherein a frequency of the AC exciter signal is offset from a data band defined by transmission of data to and from the transducer; and
   controlling the AC exciter signal to alter an attraction force between the head and the disk.

68. A method as recited in claim 67, further comprising the step of controlling the AC exciter signal to maintain a flying height between the head and the disk within a range of acceptable flying heights.

69. A method as recited in claim 68, further comprising the steps of:
   generating a flying height signal indicative of an effective capacitance between the head and the disk at the head/disk interface in response to the AC exciter signal; and
   controlling the AC exciter signal based on the flying height signal.

70. A method for operating a disk drive, wherein the disk drive comprises a disk for storing information, a head comprising a slider and a transducer for writing data to and reading data from the disk, and an AC power source coupled to the head and the disk, the method comprising the steps of:
- suspending the head adjacent to the disk;
- rotating the disk to cause air to engage the slider to form an air bearing system that forces the head away from the disk to form a flying height gap at a head/disk interface between the head and the disk; and
- establishing an AC exciter signal across the flying height gap using the AC power source, wherein a frequency of the AC exciter signal is offset from a data band defined by transmission of data to and from the transducer.

71. A method as recited in claim 70, further comprising the step of generating a flying height signal indicative of an effective capacitance between the head and the disk at the head/disk interface in response to the AC exciter signal.

72. A method as recited in claim 71, further comprising the step of generating the AC exciter signal based on the flying height signal to alter an attraction force between the head and the disk.

73. A method as recited in claim 70, further comprising the step of controlling the AC exciter signal to alter an attraction force between the head and the disk.

74. A method as recited in claim 70, further comprising the step of controlling the AC exciter signal to maintain a flying height between the head and the disk within a range of acceptable flying heights.

75. A method as recited in claim 70, in which the AC exciter signal discharges electrostatic charge on the head and the disk at the head/disk interface.

76. A disk drive, comprising:
- a disk for storing information;
- a head comprising a slider and a transducer for writing data to and reading data from the disk;
- an actuator arm assembly for suspending the head adjacent to the disk, wherein rotation of the disk causes air to engage the slider to create a flying height gap at a head/disk interface between the head and the disk;
- an AC power source coupled to the head and the disk for generating an AC exciter signal across the flying height gap, wherein the AC exciter signal reduces electrostatic change at the head/disk interface; and
- a capacitive coupler electrically connected between the AC power source and the head, wherein the capacitive coupler includes a first coupler plate mounted on the actuator arm assembly and a second coupler plate mounted on the head.

77. A disk drive as recited in claim 76, in which the AC exciter signal discharges electrostatic charge on the head and the disk at the head/disk interface.

78. A disk drive as recited in claim 76, in which the AC exciter signal is turned off during read operations and turned on during write operations.

79. A disk drive as recited in claim 76, in which the AC exciter signal has an asymmetric amplitude to compensate for potential differences between the head and the disk.

80. A disk drive as recited in claim 76, in which the AC exciter signal is a square wave.

81. A disk drive as recited in claim 80, in which the AC exciter signal has an amplitude that varies in response to electrostatic charge at the head/disk interface.

82. A disk drive as recited in claim 80, in which the AC exciter signal has a duty cycle that varies in response to electrostatic charge at the head/disk interface.

83. A disk drive as recited in claim 76, in which the AC exciter signal has a frequency that is tuned to a capacitance of the head/disk interface.

84. A disk drive as recited in claim 76, in which the AC exciter signal has a frequency that is offset from a data band defined by transmission of data to and from the transducer.

85. A disk drive as recited in claim 76, in which the AC exciter signal has a maximum amplitude that is based on characteristics of the head and the disk at the head/disk interface.

86. A disk drive as recited in claim 76, in which the AC exciter signal has a shape that is selected from the group consisting of substantially square, substantially trapezoidal, and substantially sinusoidal.

87. A disk drive as recited in claim 76, in which the AC exciter signal has a parameter that is based on a characteristic of the disk drive.

88. A disk drive as recited in claim 87, in which the parameter is an amplitude of the AC exciter signal.

89. A disk drive as recited in claim 87, in which the parameter is a duty cycle of the AC exciter signal.

90. A disk drive as recited in claim 87, in which the characteristic is a read signal strength of the transducer.

91. A disk drive as recited in claim 87, in which the characteristic is a read signal distortion of the transducer.

92. A disk drive as recited in claim 76, in which the rotation of the disk causes air to engage the slider to form an air bearing system that forces the head away from the disk to create the flying height gap at the head/disk interface.

93. A disk drive as recited in claim 92, in which the AC exciter signal damps oscillations of the air bearing system.

94. A disk drive as recited in claim 92, in which the AC exciter signal has a frequency that is offset from a natural oscillating frequency associated with the air bearing system.

95. A disk drive as recited in claim 76, further comprising a capacitance sense circuit for generating a flying height signal indicative of an effective capacitance between the head and the disk at the head/disk interface in response to the AC exciter signal.

96. A disk drive as recited in claim 95, in which the capacitance sense circuit comprises:
- a sense resistor electrically connected in parallel with the head/disk interface; and
- a current detect circuit for detecting a sense current through the sense resistor.

97. A disk drive as recited in claim 95, in which the capacitance sense circuit comprises:
- a sense resistor electrically connected in series with the head/disk interface; and
- a voltage detect circuit for detecting a sense voltage through the sense resistor.

98. A disk drive as recited in claim 76, further comprising a flying height control circuit for controlling the AC power source to generate the AC exciter signal to alter an attraction force between the head and the disk, thereby altering a flying height of the head relative to the disk.

99. A disk drive as recited in claim 98, in which the flying height control circuit controls the AC power source to alter an amplitude of the AC exciter signal to alter the attraction force between the head and the disk.

100. A disk drive as recited in claim 98, in which the flying height control circuit controls the AC power source to alter a duty cycle of the AC exciter signal to alter the attraction force between the head and the disk.

101. A disk drive as recited in claim 98, in which the flying height control circuit controls the AC power source to alter the AC exciter signal for a specific operation.

102. A disk drive as recited in claim 101, in which the operation is a read operation.

103. A disk drive as recited in claim 101, in which the operation is a write operation.

104. A disk drive as recited in claim 76, in which the first and second coupler plates are separated by a coupler gap between the actuator arm assembly and the head.

105. A disk drive as recited in claim 76, in which the capacitive coupler prevents a direct galvanic connection between the AC power source and the head.

106. A disk drive, comprising:
a disk for storing information;
a head comprising a slider and a transducer for writing data to and reading data from the disk;
an actuator arm assembly for suspending the head adjacent to the disk, wherein rotation of the disk causes air to engage the slider to create a flying height gap at a head/disk interface between the head and the disk;
an AC power source coupled to the head and the disk for generating an AC exciter signal across the flying height gap, wherein the AC exciter signal reduces electrostatic charge at the head/disk interface;
a flying height control circuit for controlling the AC power source to generate the AC exciter signal to alter an attraction force between the head and the disk in response to a flying height signal, thereby altering a flying height of the head relative to the disk and maintaining the flying height within a range of acceptable flying heights; and
a capacitive coupler electrically connected between the AC power source and the head that prevents a direct galvanic connection between the AC power source and the head, wherein the capacitive coupler includes a first coupler plate mounted on the actuator arm assembly and a second coupler plate mounted on the head.

107. A disk drive as recited in claim 106, in which the AC exciter signal discharges electrostatic charge on the head and the disk at the head/disk interface.

108. A disk drive as recited in claim 106, in which the AC exciter signal is turned off during read operations and turned on during write operations.

109. A disk drive as recited in claim 106, in which the AC exciter signal is a square wave.

110. A disk drive as recited in claim 106, in which the AC exciter signal has a frequency that is tuned to a capacitance of the head/disk interface, offset from a data band defined by transmission of data to and from the transducer, and offset from a natural oscillating frequency associated with the air bearing system.

111. A disk drive as recited in claim 106, in which the AC exciter signal has a parameter that is based on a read signal of the transducer.

112. A disk drive as recited in claim 106, in which the flying height control circuit controls the AC power source to alter an amplitude of the AC exciter signal to alter the attraction force between the head and the disk.

113. A disk drive as recited in claim 106, in which the flying height control circuit controls the AC power source to alter a duty cycle of the AC exciter signal to alter the attraction force between the head and the disk.

114. A disk drive as recited in claim 106, further comprising a capacitance sense circuit for generating the flying height signal indicative of an effective capacitance between the head and the disk at the head/disk interface in response to the AC exciter signal.

115. A disk drive as recited in claim 114, in which the capacitance sense circuit comprises:
a sense resistor electrically connected in parallel with the head/disk interface; and
a current detect circuit for detecting a sense current through the sense resistor.

116. A disk drive, comprising:
a disk for storing information;
a head suspended adjacent to the disk such that a flying height gap exist at a head/disk interface between the head and the disk, wherein the head comprises a transducer for writing data to and reading data from the disk;
an AC power source for generating an AC exciter signal, wherein the AC power source is coupled to the head and the disk such that the AC exciter signal is present across the flying height gap; and
a flying height control circuit for controlling the AC power source to generate the AC exciter signal to alter an attraction force between the head and the disk, wherein the flying height control circuit controls the AC power source to alter a duty cycle of the AC exciter signal to alter the attraction force between the head and the disk.

117. A disk drive, comprising:
a disk for storing information;
a head suspended adjacent to the disk such that a flying height gap exists at a head/disk interface between the head and the disk, wherein the head comprises a slider and a transducer for writing data to and reading data from the disk, and movement of the disk relative to the head causes air to engage the slider to form an air bearing system that forces the head away from the disk to create the flying height gap at the head/disk interface; and
an AC power source for generating an AC exciter signal, wherein the AC power source is coupled to the head and the disk such that the AC exciter signal is present across the flying height gap and a frequency of the AC exciter signal is offset from a natural oscillating frequency associated with the air bearing system.

118. A disk drive, comprising:
a disk for storing information;
a head suspended adjacent to the disk such that a flying height gap exists at a head/disk interface between the head and the disk, wherein the head comprises a transducer for writing data to and reading data from the disk; and
an AC power source for generating an AC exciter signal, wherein the AC power source is coupled to the head and the disk such that the AC exciter signal is present across the flying height gap and a frequency of the AC exciter signal is offset from a data band defined by transmission of data to and from the transducer.

119. A disk drive, comprising:
a disk for storing information;
a head suspended adjacent to the disk such that a flying height gap exists at a head/disk interface between the head and the disk, wherein the head comprises a transducer for writing data to and reading data from the disk; and
an AC power source for generating an AC exciter signal, wherein the AC power source is coupled to the head and the disk such that the AC exciter signal is present across the flying height gap, a shape of the AC exciter signal is selected from the group consisting of substantially square, substantially trapezoidal, and substantially sinusoidal and a duty cycle of the AC exciter signal is approximately fifty percent.

120. A disk drive, comprising:
a disk for storing information;
a head comprising a slider and a transducer for writing data to and reading data from the disk;
an actuator arm assembly for suspending the head adjacent to the disk;
a spindle motor for rotating the disk to cause air to engage the slider to form an air bearing system that forces the head away from the disk to form a flying height gap at a head/disk interface between the head and the disk; and
an AC power source coupled to the head and the disk for establishing an AC exciter signal across the flying height gap, wherein a DC offset of the AC exciter signal alters an attraction force between the head and the disk.

121. A disk drive, comprising:
a disk for storing information;
a head comprising a slider and a transducer for writing data to and reading data from the disk;
an actuator arm assembly for suspending the head adjacent to the disk, wherein rotation of the disk causes air to engage the slider to create a flying height gap at a head/disk interface between the head and the disk; and
an AC power source coupled to the head and the disk for generating an AC exciter signal across the flying height gap, wherein the AC exciter signal reduces electrostatic charge at the head/disk interface and includes a DC offset.

122. A disk drive as recited in claim 121, in which the DC offset alters an attraction force between the head and the disk, thereby altering a flying height of the head relative to the disk.

123. A disk drive as recited in claim 121, in which the DC offset neutralizes a built-in work function difference between the head and the disk.

124. A disk drive, comprising:
a disk for storing information;
a head comprising a slider and a transducer for writing data to and reading data from the disk;
an actuator arm assembly for suspending the head adjacent to the disk, wherein rotation of the disk causes air to engage the slider to create a flying height gap at a head/disk interface between the head and the disk; and
an AC power source coupled to the head and the disk for generating an AC exciter signal across the flying height gap, wherein the AC exciter signal reduces electrostatic charge at the head/disk interface and has a frequency that is tuned to a capacitance of the head/disk interface.

125. A disk drive, comprising:
a disk for storing information;
a head comprising a slider and a transducer for writing data to and reading data from the disk;
an actuator arm assembly for suspending the head adjacent to the disk, wherein rotation of the disk causes air to engage the slider to create a flying height gap at a head/disk interface between the head and the disk; and
an AC power source coupled to the head and the disk for generating an AC exciter signal across the flying height gap, wherein the AC exciter signal reduces electrostatic charge at the head/disk interface and has a frequency that is offset from a data band defined by transmission of data to and from the transducer.

126. A disk drive, comprising:
a disk for storing information;
a head comprising a slider and a transducer for writing data to and reading data from the disk;
an actuator arm assembly for suspending the head adjacent to the disk, wherein rotation of the disk causes air to engage the slider to create a flying height gap at a head/disk interface between the head and the disk; and
an AC power source coupled to the head and the disk for generating an AC exciter signal across the flying height gap, wherein the AC exciter signal reduces electrostatic charge at the head/disk interface and has a duty cycle that is based on a characteristic of the disk drive.

127. A disk drive, comprising:
a disk for storing information;
a head comprising a slider and a transducer for writing data to and reading data from the disk;
an actuator arm assembly for suspending the head adjacent to the disk, wherein rotation of the disk causes air to engage the slider to form an air bearing system that frees the head away from the disk to create a flying height gap at a head/disk interface between the head and the disk; and
an AC power source coupled to the head and the disk for generating an AC exciter signal across the flying height gap, wherein the AC exciter signal reduces electrostatic charge at the head/disk interface and damps oscillations of the air bearing system.

128. A disk drive, comprising:
a disk for storing information;
a head comprising a slider and a transducer for writing data to and reading data from the disk;
an actuator arm assembly for suspending the head adjacent to the disk, wherein rotation of the disk causes air to engage the slider to form an air bearing system that forces the head away from the disk to create a flying height gap at a head/disk interface between the head and the disk; and
an AC power source coupled to the head and the disk for generating an AC exciter signal across the flying height gap, wherein the AC exciter signal reduces electrostatic charge at the head/disk interface and has a frequency that is offset from a natural oscillating frequency associated with the air bearing system.

129. A disk drive, comprising:
a disk for storing information;
a head comprising a slider and a transducer for writing data to and reading data from the disk;
an actuator arm assembly for suspending the head adjacent to the disk, wherein rotation of the disk causes air to engage the slider to form an air bearing system that forces the head away from the disk to create a flying height gap at a head/disk interface between the head and the disk;
an AC power source coupled to the head and the disk for generating an AC exciter signal across the flying height gap, wherein the AC exciter signal reduces electrostatic charge at the head/disk interface and has a frequency that is tuned to a capacitance of the head/disk interface, offset from a data band defined by transmission of data to and from the transducer, and offset from a natural oscillating frequency associated with the air bearing system; and
a flying height control circuit for controlling the AC power source to generate the AC exciter signal to alter an attraction force between the head and the disk in response to a flying height signal, thereby altering a flying height of the head relative to the disk and maintaining the flying height within a range of acceptable flying heights.

130. A disk drive, comprising:

a disk for storing information;

a head suspended adjacent to the disk such that a flying height gap exists at a head/disk interface between the head and the disk, wherein the head comprises a transducer for writing data to and reading data from the disk;

an AC power source for generating an AC exciter signal, wherein the AC power source is coupled to the head and the disk such that the AC exciter signal is present across the flying height gap; and a flying height control circuit for controlling the AC power source to generate the AC exciter signal to alter an attraction force between the head and the disk, wherein the flying height control circuit controls the AC power source to increase a duty cycle of the AC exciter signal in response to electrostatic charge at the head/disk interface to discharge the electrostatic charge at the head/disk interface.

131. A disk drive, comprising:

a disk for storing information;

a head comprising a slider and a transducer for writing data to and reading data from the disk;

an actuator arm assembly for suspending the head adjacent to the disk, wherein rotation of the disk causes air to engage the slider to create a flying height gap at a head/disk interface between the head and the disk;

an AC power source coupled to the head and the disk for generating an AC exciter signal across the flying height gap; and a capacitance sense circuit for sensing a head/disk capacitance at the head/disk interface in response to the AC exciter signal, the capacitance sense circuit comprises a sense resistor electrically connected in parallel with the head/disk interface; and a current detect circuit for detecting a sense current through the sense resistor.

\* \* \* \* \*